United States Patent

Schwefel

[15] 3,638,186

[45] Jan. 25, 1972

[54] ARRANGEMENT FOR ERROR DETERMINATION

[72] Inventor: Ernst Schwefel, Chieming, Germany

[73] Assignees: Dr. Johannes Heidenhain, Traunreut nr. Traunstein, Germany

[22] Filed: Sept. 26, 1969

[21] Appl. No.: 861,265

[52] U.S. Cl. ........ 340/146.1, 235/92

[51] Int. Cl. ........ G06f 11/10

[58] Field of Search ........ 235/153, 92, 151.11; 340/347, 340/146.1; 318/18

[56] References Cited

UNITED STATES PATENTS

| | | | |
|---|---|---|---|
| 2,886,717 | 5/1959 | Williamson et al. | 235/92 X |
| 3,193,667 | 7/1965 | Walker | 235/153 |
| 3,196,258 | 7/1965 | Belcastro | 235/153 |
| 3,228,021 | 1/1966 | Lehmer | 340/347 |
| 3,471,852 | 10/1969 | Floyd | 340/347 |

*Primary Examiner*—Charles E. Atkinson
*Attorney*—Ernest G. Montague

[57] ABSTRACT

A method and device for error prevention in incremental measuring systems which comprise a measuring scale and a sensing device producing, during relative movement, sensing signals, and an electronic circuit, and a counter circuit of a measuring system. A comparison is performed of the residue of the counter result after subtraction of a whole multiple of a full number *n* with signals and signal combinations, respectively, derived from the sensing signals which bypass the counter circuit.

9 Claims, 1 Drawing Figure

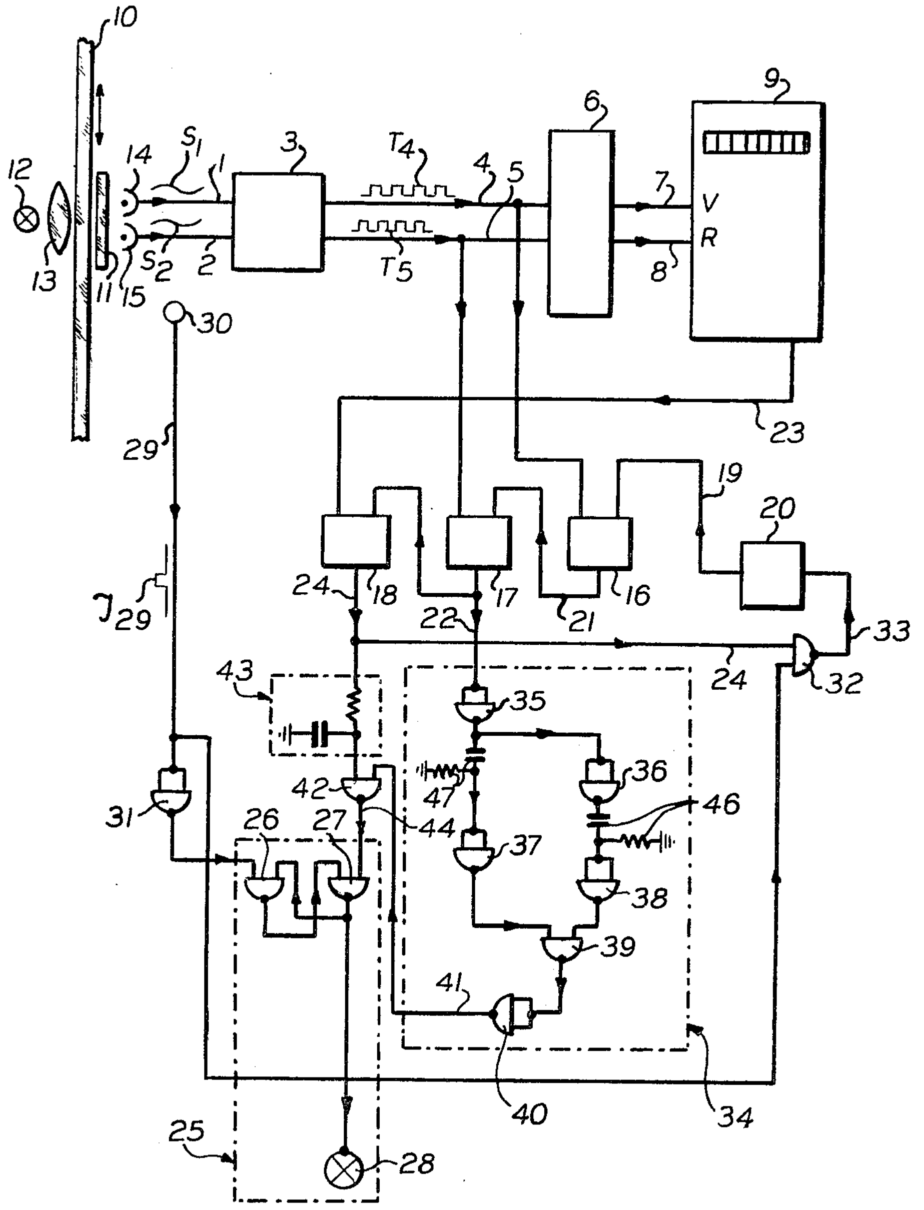
INVENTOR
ERNST SCHWEFEL
BY
ATTORNEY.

ARRANGEMENT FOR ERROR DETERMINATION

The present invention relates to an arrangement for error prevention in incremental measuring systems.

Arrangements for error prevention in incremental measuring systems have been known, in which disturbing impulses injected into a transmission path are suppressed by the fact, that impulses to be transmitted are fed as complementary impulses of an equal phase position on different channels to a logic network on the receiver side, whereby impulses are emitted only through an output of the logic network, if on both transmission channels simultaneously two complementary signals arrive.

With arrangements of this type, not all types of disturbing impulses can be covered.

It is, therefore, one object of the present invention to provide an arrangement for error prevention, wherein the drawbacks of known arrangements are eliminated and in which with reliable simple means, a reliably working arrangement for error prevention in incremental measuring systems is created.

It is another object of the present invention to provide an arrangement for error prevention, wherein in an electronic circuit for error recognition a comparison of the residue of the counting result after subtraction by a full number *n* is performed with signals and signal combinations, respectively, derived from the sending signals with avoidance of the counter circuit of the measuring system.

In the electronic circuit for error recognition, for instance, a comparison of the residue of the counting result after subtraction by the number 2, 4, 10, or the like can be performed with signal combinations derived from the sensing signals.

For the formation of the residue of the counting result after subtraction of a whole multiple of a full number *n*, the logical state prevailing in one of the digits of the lowermost stage of a known *n*-digit electronic counter can be applied.

In connection with a further development of the present invention, an error indication unit of the electronic circuit is put out of operation for a short time period at the circuit positions of the counter impulses of the incremental measuring system, so that a lack of error prevention at the switching positions of the counter impulses is eliminated.

Furthermore, the electronic circuit for the error prevention is designed such that an impulse causing the cancellation of the error indication puts into operation simultaneously the correct examination modus for the momentary coordination of the counting result and the sensing signals.

With these and other objects in view, which will become apparent in the following detailed description, the present invention, which is shown by example only, will be clearly understood in connection with the accompanying drawing, in which the only FIGURE discloses the arrangement designed in accordance with the present invention for the error prevention in increment-measuring systems.

Referring now the the drawing, the incremental measuring system may comprise a photoelectric grid sensing device of known structure, over the output 1 and 2 of which electrical signals $S_1$ and $S_2$ are fed to an electronic structural unit 3, which contains, in the embodiment shown in the drawing, amplifiers, triggers, as well as a dividing stage for the signals $S_1$ and $S_2$. The signals $T_4$ and $T_5$ emitted through the outputs 4 and 5 of the electronic structural unit 3 control an electronic directional discriminator 6 of known design, the emitted impulses of which are fed by means of an output 7 to the forward input V and by means of the other output 8 to the reverse input R of an electronic counter 9.

For the illumination of a grid scale 10 and a grid sensing plate 11 of the incremental measuring system, a lamp 12 and a condenser 13 are provided. The light bundle passing through the grid sensing plate 11 is concentrated by means of objectives (not shown) to photoelectronic structural elements 14 and 15. On the grid sensing plate 11, in the embodiment disclosed in the drawing, two dividing spurs are provided, which are set off relative to each other in the measuring direction such that the signal $S_1$ and $S_2$ delivered from the photoelectronic structural elements 14 and 15 have a phase displacement of about 90°. The described measuring system can be used for the positioning of objects movable relative to each other, for instance, of machine parts. On one object, not shown in the drawing, for instance, on the displaceable object, e.g., the movable slide of a machine, the grid scale 10 is affixed, and on the other object, e.g., the machine bed, the sensing device of a measuring system consisting of a grid sensing plate 11, photoelectronic structural elements 14 and 15 and an illumination device 12 and 13 can be provided.

In accordance with the present invention, an electronic circuit is provided for the error prevention of the incremental measuring system, for example, a comparison of the residue of the counting result of the electronic counter 9 after subtraction of a whole multiple of 2 with signals emitted from the sensing signals $T_4$ and $T_5$. For the formation of the residue of the counting result after subtraction of a whole multiple of 2, the logical state prevailing in one of the digits of the lowermost stage of a known *n*-digit electronic counter 9 can be applied.

The electronic circuit for the error prevention may comprise three exclusive-OR-gates 16, 17, and 18 of known design. A sensing signal $T_4$ is fed to an input of the first exclusive-OR-gate 16 by shunting the electronic direction discriminator 6 and counter 9 over the conduit 4, while with the other input of this gate, is connected the output 19 of a flip-flop 20 determining the examination modus. The output 21 of the first exclusive-OR-gate 16 is connected with one of the inputs of the second exclusive-OR-gate 17, while the second sensing signal $T_5$ is fed to the other input of this gate by means of the conduit 5. The output 22 of the second exclusive-OR-gate 17 is connected with one of the inputs of the third exclusive-OR-gate 18, while the other input of this gate is connected, for example, with the output 23 of one of the digits of the lowermost stage of the electronic counter 9. The impulses emitted over the output 24 of the third exclusive-OR-gate 18 control an error indication unit 25, which can contain a so-called "set-reset" flip-flop of known design composed of NAND-gates 26 and 27, as well as a lamp 28.

In the embodiment disclosed in the drawing, the output 29 of an electric switch 30 is directly connected with one of the inputs of a NAND-gate 32 and furthermore by means of an intermediate arrangement of a NAND-gate 31 with mentioned "set-reset" flip-flop 26/27 of the error indication unit 25. The other input of the NAND-gate 32 is connected with the output 24 of the mentioned third exclusive-OR-gate 18. The pulses $\overline{\mathcal{J}_{29}}$ emitted by means of the output 29 of the switch 30 control the flip-flop 20, which determines the examination modus. The impulse $\mathcal{J}_{29}$ causing the extinguishing of the lamp lighting up in case of errors simultaneously brings by this also into effect the correct examination modus for the momentary coordination of the counting result and the sensing signals $T_4$ and $T_5$.

The output 22 of the second exclusive-OR-gate 17 is fed to an electronic structural unit 34, which comprises NAND-gate 35, 36, 37, 38, 39, and 40, as well as differential members 46 and 47. The electronic structural unit 34 emits in the immediate vicinity the switching jumps of the counter impulses of the incremental measuring system over its output 41. The output 41 of the electronic structural unit 34 is connected with one of the inputs of an NAND-gate 42, the other input of which is connected with the output 24 of the third exclusive-OR-gate 18. In the conduit 24 of the grate 18, an electronic retarding member 43 of known design is provided for the running time equalization of the impulses. The output 44 of the last-mentioned NAND-gate 42 is connected with one of the inputs of the flip-flop 26/27 (NAND-gates 26 and 27) of the error indication unit 25. By the electronic structural unit 34 it is brought about, that the error indication unit 25 is put out of operation for short time periods at the moments when the counter impulses $T_4$ and $T_5$ of the incremental measuring system rise and fall, so that insecurities at the switching points of the counter impulses are practically ineffective.

Upon occurrence of an error, the warming lamp 28 of the error indication unit 25 lights up. By operation of the electrical switch 30 an impulse $\mathcal{J}_{29}$ is emitted by means of the conduit 29, which impulse $\mathcal{J}_{29}$ causes the extinguishing of the warning lamp 28. Prior to the extinguishing of the warning lamp 28 or simultaneously with the extinguishing of the warning lamp 28, the counting result must be correctly set.

The present invention is, of course, not limited to the arrangement where the incremental measuring system is a photoelectric gate sensing device, rather the incremental measuring system can be for instance, of capacitive, inductive or magnetic design.

While I have disclosed one embodiment of the present invention, it is to be understood, that this embodiment is given by example only and not in a limiting sense.

I claim:

1. An arrangement for error prevention in incremental measuring systems comprising a measuring scale and a sensing device relatively movable with respect to each other and producing error-containing sensing signals thereby, comprising an electronic counter means receiving said error-containing sensing signals and for providing a counting result, an electronic circuit comprising three exclusive-OR-gates, means for feeding one of said sensing signals to an input of one of said exclusive-OR-gates bypassing said electronic counter means, a flip-flop means for determining an examination modus and having an output being connected with the other input of said one exclusive-OR-gate, the output of said one exclusive-OR-gate being connected with one of the inputs of a second of said exclusive-OR-gates, means for feeding the other of said sensing signals phase displaced relative to said one of said sensing signals to the other input of said second exclusive-OR-gate, the output of the second exclusive-OR-gate being connected with one of the inputs of a third of said exclusive-OR-gates, and the other input of said third exclusive-OR-gate being connected with an output of one digit of a lowermost stage of said counter means, and an error indication means connected to the output of said third exclusive-OR-gate for controlling the error indication unit by impulses emitted from said third exclusive-OR-gate.

2. The arrangement, as set forth in claim 1, further comprising an electronic means connected to the output of said second exclusive-OR-gate, said electronic means for emitting impulses in the immediate vicinity of switching steps of counting impulses of said incremental measuring system by means of its output, a NAND gate having an input connected to the output of said electronic means, an electronic retarding member is connected to the output of said third exclusive-OR-gate, the other of the inputs of said NAND gate is connected with the output of said electronic retarding member, the output of said NAND gate is connected to said error indication unit, and means for making inoperative the indication of errors by said error indication means for short time periods at moments when said counting impulses of said measuring system rise and fall.

3. The arrangement, as set forth in claim 1, further comprising a first and second NAND gate, an electric switch is connected by its output directly with one of the inputs of said first NAND gate, the input of said second NAND gate is connected to the output of said electric switch, said error indication means includes a set-reset flip-flop connected to the output of said second NAND gate, the other of said inputs of said first NAND gate is connected with the output of said third exclusive-OR-gate, and the output of said first NAND gate is connected to said flip-flop means.

4. A method for error prevention in incremental measuring systems having a measuring scale and a sensing device relatively movable with respect to each other and producing error-containing sensing signals thereby, comprising the steps of sending said error-containing sensing signals to a counter to provide a counting result, forming a residue of the counting result after a subtraction thereof of a whole multiple of a full number, and comparing said residue with said sensing signals bypassing said counter.

5. The method, as set forth in claim 4, wherein said whole multiple of a full number is 2.

6. The method, as set forth in claim 4, wherein said whole multiple of a full number of 4.

7. The method, as set forth in claim 4, wherein said whole multiple of a full number is 10.

8. The method as set forth in claim 4, wherein for the formation of said residue after subtraction of a whole multiple of a full number $n$, the logical state prevailing in one of the digits of the lowermost stage of an $n$-digit electronic counter is applied.

9. The method as set forth in claim 4, further comprising the step of causing the cancellation of an error indication and rendering effective simultaneously an examination modus for a momentary coordination of the counter result and sensing signals.

* * * * *